(12) United States Patent
Nishi et al.

(10) Patent No.: US 8,157,954 B2
(45) Date of Patent: Apr. 17, 2012

(54) METHOD OF RECOVERING A BASE PAPER FOR GYPSUM BOARD

(75) Inventors: Michio Nishi, Tokyo (JP); Takehiro Tanaka, Tokyo (JP); Shizuo Taira, Tokyo (JP)

(73) Assignee: Yoshino Gypsum Co., Ltd., Tokyo (JP)

( * ) Notice: Subject to any disclaimer, the term of this patent is extended or adjusted under 35 U.S.C. 154(b) by 259 days.

(21) Appl. No.: 10/583,881

(22) PCT Filed: Dec. 6, 2004

(86) PCT No.: PCT/JP2004/018148
§ 371 (c)(1),
(2), (4) Date: Jun. 21, 2006

(87) PCT Pub. No.: WO2005/061133
PCT Pub. Date: Jul. 7, 2005

(65) Prior Publication Data
US 2007/0145621 A1    Jun. 28, 2007

(30) Foreign Application Priority Data
Dec. 22, 2003    (JP) .................................. 2003-424752

(51) Int. Cl.
*D21B 1/32* (2006.01)
(52) U.S. Cl. ........................................................ 162/4
(58) Field of Classification Search ...... 162/4; 264/37.1
See application file for complete search history.

(56) References Cited

U.S. PATENT DOCUMENTS 5,255,540 A * 10/1993 LeBlanc et al. ............. 68/181 R
6,470,898 B1 * 10/2002 Kamo ............................. 134/79

FOREIGN PATENT DOCUMENTS

| GB | 209648 | 1/1924 |
|---|---|---|
| JP | 06-142638 | 5/1994 |
| JP | 08-176985 | 7/1996 |
| JP | 10-296224 | 11/1998 |
| JP | 11-189981 | 7/1999 |
| JP | 11-200269 | 7/1999 |
| JP | 11-278891 | 10/1999 |
| TW | 301335 | 3/1997 |
| TW | 311118 | 7/1997 |
| WO | 96/19613 A1 | 6/1996 |

OTHER PUBLICATIONS

JP 06-142638 A, English Machine Translation from the JPO.*

(Continued)

*Primary Examiner* — Anthony Calandra
(74) *Attorney, Agent, or Firm* — Ladas & Parry LLP

(57) ABSTRACT

There are provided a method of recovering a base paper for gypsum board for continuously and efficiently recovering a base paper for gypsum board from a waste material of gypsum board including a gypsum core and the base paper for gypsum board adhering thereto. The method of recovering a base paper for gypsum board includes steps of breaking the waste material of gypsum board, separating a gypsum component and a paper piece of the base paper for gypsum board from the broken waste material of gypsum board, and washing the separated paper piece with water using a rotary drum-type washing device so as to eliminate a gypsum component adhering to the paper piece.

4 Claims, 2 Drawing Sheets

OTHER PUBLICATIONS

Hamilton et al. Editor, Pulp and Paper Manufacture: Secondary Fibers and Non-wood Pulping, 1987, Joint Textbook Committee of the Paper Industry,p. 159-161, p. 189-191, p. 196-199.*
Smook, Handbook for Pulp and Paper Technologists, 1992, Angus Wilde Publications, 2nd edition, p. 102-108 and 228.*
Definition of sieve, downloaded online May 13, 2010 from www.google.com.*
Smook, Handbook for Pulp and Paper Technologists, 1992, Angus Wilde Publications, 2nd edition, chapters 13 and 14.*
European Search Report dated Jun. 12, 2008; Application No./Patent No. 04820672.6-1253 PCT/JP2004018148.
Gary Smook; "Pulp Papermaking Industry", $5^{th}$ Edition, Korean Textbook Co., Ltd., Aug. 25, 1996, pp. 253-254.

* cited by examiner

METHOD OF RECOVERING A BASE PAPER FOR GYPSUM BOARD

TECHNICAL FIELD

The present invention relates to a method of recovering a base paper for gypsum board and apparatus of recovering a base paper for gypsum board.

BACKGROUND ART

A gypsum board is frequently used as a material for building since it has a fire resistance, a sound insulating property, etc., and is economic. Such a gypsum board is a plate-type structure obtained by covering a core material based on gypsum (referred to as "core" below) with a base paper for gypsum board (referred to as a "base paper" below), and a gypsum board product with a thickness of 12.5 mm is composed of approximately 93% by weight (abbreviated as "%" below) of gypsum and approximately 7% of a base paper. The gypsum board is used throughout a building and the remaining end part(s), etc., (as referred to as a "waste material", and a waste material produced in a new building site is referred to as a "new building waste material" and a waste material produced in a demolition site is referred to as a "demolition waste material", below) cut out depending on the dimensions of a used part is/are produced in a building site. The production rate of new building waste materials is deduced to be approximately 10% of the used amount at the time of building and, as the annual usage of gypsum boards being approximately five million tons is taken into consideration, approximately 50 million tons of new building waste materials are consequently produced as industrial wastes. Also, the production quantity of demolition waste materials produced by the demolition of an existing building was approximately 90 million tons in the year 2002, according to estimation by an aggregate corporation, Gypsum Board Industry Association, and it is expected that the production quantity of demolition waste materials will increase in future.

In regard to new building waste materials among these waste materials, recycle routes such as a wide-area recycling industry route approved by the environment ministry and intermediate processing industry routes approved by prefectural governor are established and approximately 50% of the production quantity of new building waste materials is utilized as a material for manufacturing a new gypsum board. On the other hand, the remaining new building waste materials and demolition waste materials are dumped in landfill, etc., similarly to other industrial wastes. However, a waste gypsum board to which a paper has adhered is dealt as an industrial waste of controlled type and further promotion of separation recycle is socially desired with the lack of the capacity of remaining landfill space and the implementation of Construction Material Recycling Act.

As described above, although the increase of the recycle rate for a waste material in future is expected, the recycle of a gypsum board waste material to a raw material of gypsum at present is conducted by, first, coarsely breaking a waste material of gypsum board into a size of approximately 10 cm square, then finely breaking the coarsely broken waste material of gypsum board into a size of approximately several cm square, screening the broken waste material according to need to separate paper pieces of a base paper for gypsum board from the broken waste material and subsequently compounding gypsum of the broken waste material of gypsum board into gypsum of a common raw material for gypsum board. However, when the gypsum component remains dihydrate gypsum, if the broken waste material is subjected to screening, the weight of gypsum component having adhered to separated paper pieces is 50% or greater of the weight of the paper pieces, and even though the screened waste material is further subjected to screening, the gypsum component having adhered to the paper pieces is reduced by only 5-10%. It is considered that the cause of the adhesion of the gypsum component to the paper pieces is that the gypsum component of dihydrate gypsum is a needle crystal and is deeply embedded into the paper pieces of the base paper for gypsum board. In addition, when a waste material of gypsum board is moisturized or wetted, the problem is that trouble such as the adhesion of the waste material to a transportation apparatus for transporting the waste material, clogging of a screening apparatus, etc., is easily caused.

Also, when recycle rate of waste material is low, for example, approximately 5%, a serious problem is not made even though the entire quantity of a paper component is directly recycled. However, the recycle rate of the waste material is approximately 10% or greater, the recycle of the entire quantity of the paper component is not preferable since the fire resistance property of a gypsum board product may be lowered due to the increase of the content of the paper component in the core of the product and more kneading water is required in the manufacture of a gypsum board. Also, the problem occurs that paper pieces are dispersively found in the core portion of the product and the appearance of a gypsum board product degrades accordingly. Thus, the recycle of the entire quantity of the paper component is limited with respect to fireproof, productivity, quality, etc. Therefore, in order to improve the recycle rate of a waste material, the elimination of a paper component from the waste material is becoming inevitable.

On the other hand, in regard to paper pieces separated from a waste material of gypsum board, the less a gypsum component having adhered to the paper pieces is, the more paper pieces can be recycled for a raw material for waste paper, a raw material for agriculture (for fertilizer) and other industrial applications. Therefore, a method for separating paper pieces containing a little gypsum component from the waste material of gypsum board is much needed.

The following Japanese Laid-Open Patent Application No. 06-142638 and Japanese Laid-Open Patent Application No. 08-176985 can be listed as documents for conventional techniques which have relevance with the invention of the subject application.

Japanese Laid-Open Patent Application No. 06-142638 discloses a method for recovering a base paper for gypsum board and gypsum from a waste material of gypsum board, characterized in that after a waste material of gypsum board is heated in which a base paper for gypsum board has adhered to at least one part of a gypsum core, water is supplied to the waste material of gypsum board to separate the base paper for gypsum board from the gypsum core and gypsums constituting the separated base paper for gypsum board and gypsum core are recovered, respectively.

Herein, as a method for recovering the base paper, there are disclosed a method of dipping the waste material of gypsum board in a water tank after heating (and cooling) it and recovering paper floating on water surface (floatation separation method), a method of supplying water to a heated gypsum board, etc. Also, this document discloses, as a practical example, the entire quantity (1.31 kg) of paper pieces to which burnt gypsum had adhered was thrown into 20 liters of water and after shortly agitating operations of recovering the paper pieces on a screen were repeated three times whereby the burnt gypsum had adhered to the paper pieces could be completely washed out and paper pieces to which no gypsum adhered (dry weight: 693 g) were obtained.

However, specific means and conditions for continuously water-wash treating paper pieces to which gypsum has adhered is not disclosed or suggested.

Also, Japanese Laid-Open Patent Application No. 08-176985 discloses a paper material washing apparatus provided with a device for supplying washing water to a paper material in a rotatably lying air and water through-flow drum having both a paper material inlet at one side of the air and water through-flow drum and a paper material outlet at the other side thereof, which apparatus is a rotary drum-shaped washing apparatus capable of drastically improving the dispersion effect of a fiber component and replacement and washing effect (deinking and dust removing effect), wherein baffle plates extending along the internal peripheral surface of the air and water through-flow drum in the peripheral direction are arranged with intervals in the axial direction and scrape up plates for scraping up paper material liquid to the drum revolving direction are arranged with intervals between the adjacent baffle plates in the peripheral direction, and wherein a paper material thrown into the paper material inlet overflows each of washing zones formed between the baffle plates one by one and reaches the paper material outlet and the scraping up to the peripheral direction of the paper material by the scrape up plates and the flowing downward of it by gravity are repeated by the revolution of the air and water through-flow drum in each of the washing zones between the baffle plates.

However, there is not disclosed or suggested that, after pretreatment such as preparatory breaking and paper piece separation is applied to a waste material of gypsum board, a rotary drum-shaped washing apparatus is used for washing separated paper pieces.

DISCLOSURE OF THE INVENTION

Problems to be Solved by the Invention

It is an object of the present invention is to provide a method of recovering a base paper for gypsum board and an apparatus of recovering a base paper for gypsum board which are capable of recovering a paper piece of the base paper for gypsum board from a waste material of gypsum board continuously and efficiently.

Means for Solving the Problem

The method of recovering a base paper for gypsum board according to the present invention is a method of recovering a base paper for gypsum board, which is configured to recover a base paper for gypsum board from a waste material of gypsum board comprising a gypsum core and the base paper for gypsum board adhering thereto, comprising steps of breaking the waste material of gypsum board, separating a gypsum component and a paper piece of the base paper for gypsum board from the broken waste material of gypsum board, and washing the separated paper piece with water using a rotary drum-type washing device so as to eliminate a gypsum component adhering to the paper piece.

The apparatus of recovering a base paper for gypsum board according to the present invention comprises a device configured to break a waste material of gypsum board, a device configured to separate a burnt gypsum component and a paper piece from the broken waste material of gypsum board, a rotary drum-type washing device configured to wash the separated paper piece with water so as to eliminate a burnt gypsum component adhering to the paper piece, and a device configured to dewater the water-washed paper piece.

Advantageous Effect of the Invention

According to the present invention, a method of recovering a base paper for gypsum board and an apparatus of recovering a base paper for gypsum board can be provided which are capable of recovering a paper piece of the base paper for gypsum board from a waste material of gypsum board continuously and efficiently.

BEST MODE FOR CARRYING OUT THE INVENTION

Figure 1:
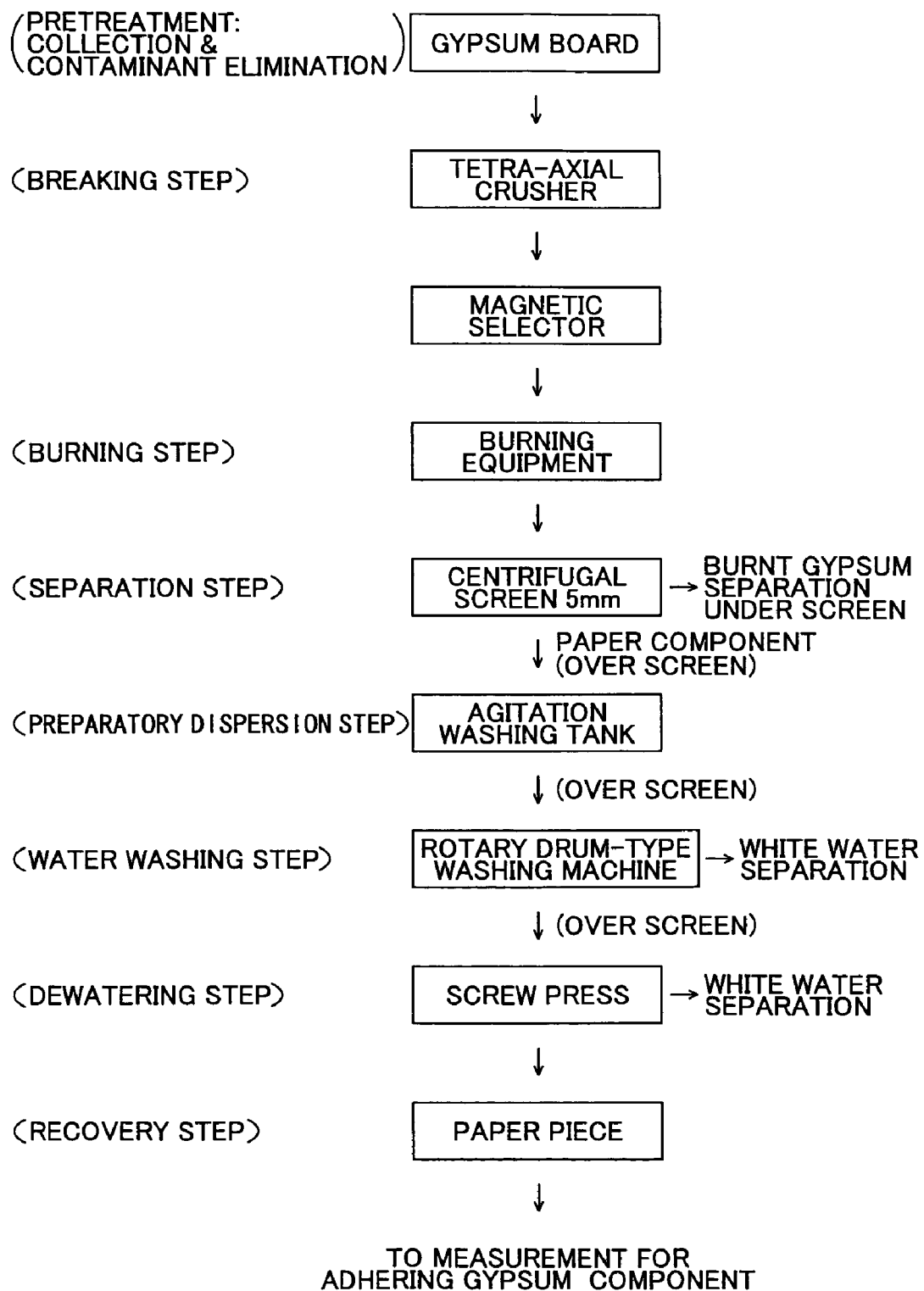
FIG. 1 is a flowchart showing steps of processing a waste material of gypsum board in an embodiment of the present invention.

The first aspect of the present invention is a method of recovering a base paper for gypsum board, which is configured to recover a base paper for gypsum board from a waste material of gypsum board including a gypsum core and the base paper for gypsum board adhering thereto, including steps of breaking the waste material of gypsum board, separating a gypsum component and a paper piece of the base paper for gypsum board from the broken waste material of gypsum board, and washing the separated paper piece with water using a rotary drum-type washing device so as to eliminate a gypsum component adhering to the paper piece.

Preferably, the method of recovering a base paper for gypsum board further includes a step of burning the broken waste material of gypsum board or the separated paper piece, wherein the burning step is provided before the water washing step.

Preferably, the method of recovering a base paper for gypsum board further includes a step of dewatering the water-washed paper piece.

Preferably, the method of recovering a base paper for gypsum board further includes a step of previously dispersing or mixing the separated paper piece into a portion of washing water before the separated paper piece is introduced to the rotary drum-type washing device.

Preferably, in the method of recovering a base paper for gypsum board, a ratio of a weight of the separated paper piece to a weight of fresh water in the washing water is in a range of 1:5-1:100.

Preferably, in the step of previously dispersing or mixing the separated paper piece into a portion of washing water in the method of recovering a base paper for gypsum board, a ratio of a weight of the separated paper piece to a weight of the portion of washing water is in a range of 1:1-1:15.

Preferably, in the method of recovering a base paper for gypsum board, the step of dewatering the paper piece includes squeezing and dewatering of the water-washed paper piece.

The second aspect of the present invention is an apparatus of recovering a base paper for gypsum board, including a device configured to break a waste material of gypsum board, a device configured to separate a burnt gypsum component and a paper piece from the broken waste material of gypsum board, a rotary drum-type washing device configured to wash the separated paper piece with water so as to eliminate a burnt gypsum component adhering to the paper piece, and a device configured to dewater the water-washed paper piece.

Preferably, the apparatus of recovering a base paper for gypsum board further includes a device configured to burn the broken waste material of gypsum board.

Preferably, the apparatus of recovering a base paper for gypsum board further has a device configured to disperse or mix the separated paper piece into water before washing the separated paper piece with water.

Preferably, in the apparatus of recovering a base paper for gypsum board, the dewatering device is a device configured to squeeze and dewater the water-washed paper piece.

Figure 2:
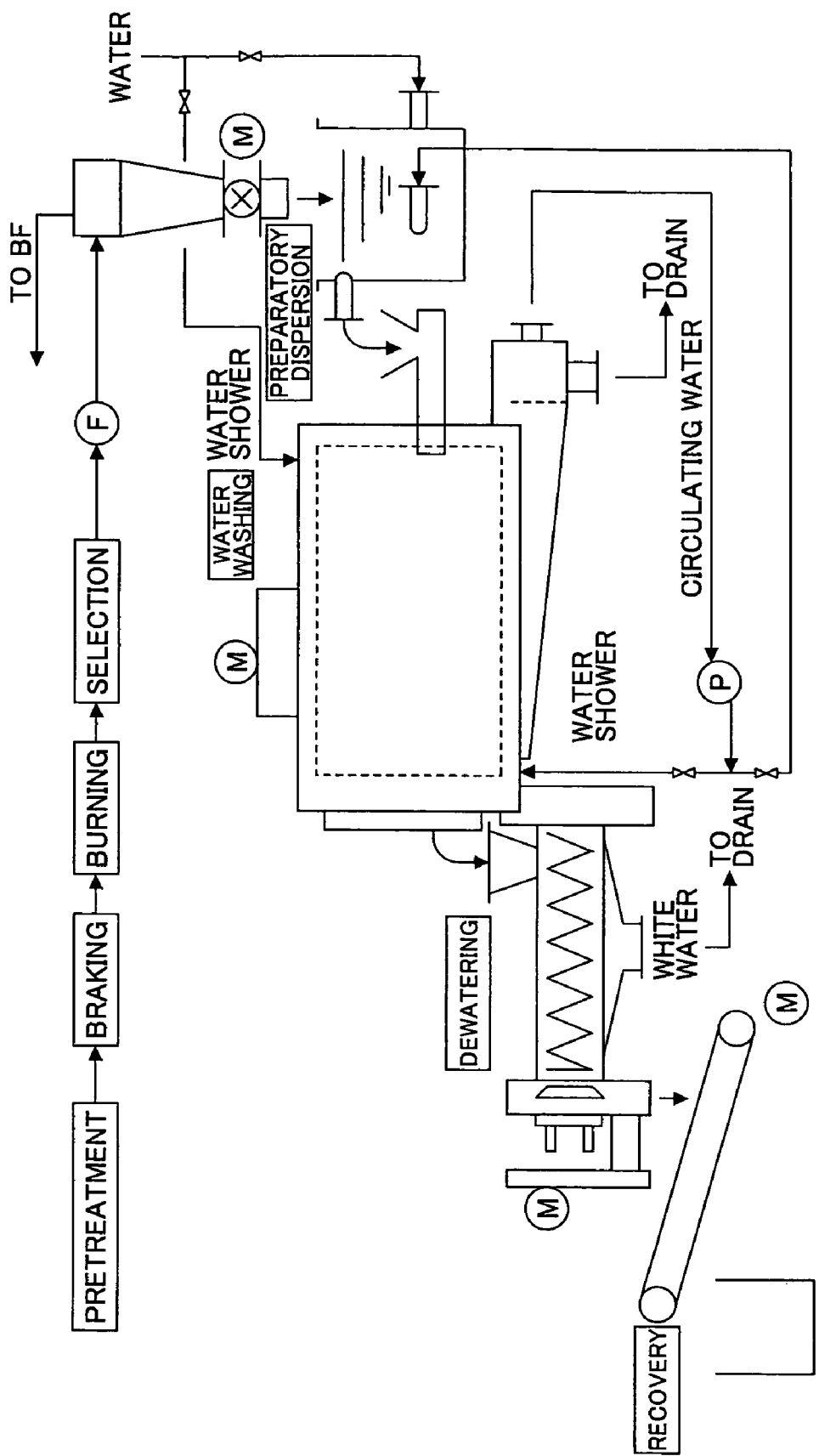
FIG. 2 is a schematic diagram showing the configuration of an apparatus for processing a waste material of gypsum board in an embodiment of the present invention.

Next, an embodiment of the present invention is described with reference to FIG. 1 and FIG. 2. FIG. 1 is a flowchart showing steps of processing a waste material of gypsum board in the embodiment of the present invention and FIG. 2 is a schematic diagram showing the configuration of an apparatus for processing a waste material of gypsum board in the embodiment of the present invention.

Generally, a gypsum board as an object to which the method of recovering a base paper for gypsum board according to the present invention is applied has a structure such that a side face of a gypsum core is covered with a base paper for gypsum board, and the shape of a waste material of gypsum board is board-like, block-like, or powder-like.

As a stage before applying the method of recovering a base paper for gypsum board according to the present invention, for example, a treatment for eliminating a contaminant from a collected waste material of gypsum board as an object is conducted. Thus, a prepared waste material is processed as follows in accordance with a process of the method of recovering a base paper for gypsum board according to the present invention.

[Breaking Step]

Particularly, in the case of a board-like or block-like waste material of gypsum board, a breaking step is provided before a heating step in order to size the waste material so that it can be heated uniformly. In the breaking step, the waste material of gypsum board is broken into an adequate size. A breaking method is not particularly limited and the breaking is conducted by means of common compression, impact, shearing, friction, cutting, etc. In the present invention, a tetra-axial crusher is preferably used. It is only necessary that the degree of breaking of the waste material of gypsum board is a size such that gypsum may remain adhering or partial joining to an adhesive surface between a gypsum core and a base paper and broken gypsum core can be uniformly heated. The longitudinal diameter of a broken piece of the waste material of gypsum board is preferably 100 mm or less, more preferably 20 mm or less.

[Burning Step]

The broken waste material of gypsum board is sent to a subsequent burning step. In this case, the broken waste material of gypsum board may be heated directly, but paper pieces may be screened after the breaking step and only paper pieces which are previously separated by a screen may be burnt. That is, before the broken waste material of gypsum board is heated, the broken waste material of gypsum board may be subjected to screening so that gypsum (dihydrate gypsum) powder having passed through a screen is recycled as a raw material of gypsum and only a base paper remaining on the screen, to which paper the gypsum have adhered, may be sent to the burning step. When such a screening step is adopted, the efficiency of processing a waste material of gypsum board can be drastically improved.

Also, it is recommended that a metallic contaminant, etc., is eliminated from the base paper using a magnet for metal elimination, a magnetic selector, etc., in process of the delivery of the broken object to the burning step.

As a method of heating in the burning step of the present invention, the broken waste material of gypsum board may be directly heated using a rotary kiln, etc., or may be indirectly heated using a vertical furnace, etc. Also, it is only necessary that the heating temperature is temperature at which gypsum (dihydrate gypsum) can be converted to a form of hemihydrate gypsum or hemihydrate gypsum containing a part of soluble anhydrous gypsum (burnt gypsum), and, for example, it is in a range of 100-200® C. A preferable range of the heating temperature is 130-190° C. At temperature in the range, it is desirable to heat a waste material of gypsum board, commonly for 0.25-3 hours, preferably 1-2 hour(s).

Since the solubility of dihydrate gypsum in 100 g of water is 0.181 g at 3° C. and 0.204 g at 50° C., the waste material of gypsum board can be directly washed with water. However, for example, the solubility of β type dihydrate gypsum is 1.006 g at 3° C. and 0.426 g at 50° C. and, therefore, since a gypsum component is more easily dissolved in water by converting dihydrate gypsum to burnt gypsum in the burning step, washing effect in a subsequent water-washing step can be further improved.

Additionally, as a preferred embodiment of the present invention, the breaking step and the burning step can be conducted simultaneously. Also, a step of separating gypsum and base paper for board can be combined with the breaking step and/or the burning step.

As such a method, for example, a method of breaking a waste material of gypsum board in a chamber heated at predetermined temperature can be provided. Also, when, further, breaking and burning are conducted and the separation between gypsum and a base paper for board is accelerated, by blowing hot air at predetermined temperature and air flow rate, these plural steps can be efficiently conducted at a given time.

Additionally, the burning step can be omitted in the method of recovering a base paper for gypsum board according to the present invention.

[Separation Step]

In a preferred embodiment of the present invention, before transferring to a washing step, the broken and heated waste material of gypsum board is coarsely separated into a base paper for gypsum board and a gypsum component by a process of dry screening, etc., and paper pieces of the base paper for gypsum board are recovered. Then, the separation method may be any dry-type method, and, for example, a method of using a vibrating screen or a rotating screen can be provided. The size of screen mesh is 2-20 mm, preferably 5-8 mm. Recovered burnt gypsum can be recycled as a raw material for a gypsum board, etc. In this embodiment, a centrifugal screen with 5 mm mesh is used.

When the heated waste material for gypsum board is subjected to a screening process, burnt gypsum powder passing through a screen is recovered and only paper pieces remaining on the screen to which burnt gypsum has adhered are transported to a location for the subsequent water-washing step. Thus, commonly approximately 20-50% by weight (simply represented by % below) of a gypsum component has adhered to the separated paper pieces before water washing.

For the transportation of the paper pieces, commonly used continuous transportation means can be employed and, for example, a belt-type or bucket-type conveyer or snake conveyer, screw-type transportation means, and pneumatic transportation can be provided. For example, in the pneumatic transportation, transported paper pieces are transported through a pipe-shaped transportation channel using air as a medium and conventionally and generally used low pressure transportation (low density transportation) method is preferable. The low pressure transportation method is a transportation method using velocity energy of air for transportation, wherein the speed of wind for transporting paper pieces is needed to be approximately 5-50 m/s depending on the paper pieces to be transported and a transporting distance and the paper pieces float and travel in a pipe. As a air supply, a roots blower is employed for supplying comparatively constant flow rate of air against pressure variation. As a low pressure transportation method, pumping type for transporting paper pieces at a pressure in a pipe which is a positive pressure, a suction type for transporting paper pieces at a negative pressure, and, further, a suction and pumping type for transporting paper pieces at the combination of a positive pressure and a negative pressure can be provided and any of them can be used. The speed of wind for transporting paper pieces is 5-50 m/s, the mixing ratio of an object to be transported and transportation air is 5 or less, and the length of a transportation pipe is 10-300 m. In the air transportation, it is also preferable to separate a metal contaminant, etc., from paper pieces again using a magnet, a magnetic selector, or the like, or utilizing the difference of specific gravities of paper pieces and a contaminant.

[Water Washing Step]

The paper pieces recovered through the separation step is subsequently washed in the water-washing step. In the water-washing step for paper pieces in the method of recovering a base paper for gypsum board according to the present invention, a rotary drum-type washing device is used. Herein, the rotary drum-type washing device is a device which has, for example, a paper piece inlet at one end of a rotatably lying air and water through-flow drum and a paper piece outlet at the other end of the air and water through-flow drum and can supply washing water to paper pieces in the air and water through-flow drum. As described above, after pretreatment which may include preparatory breaking and paper piece separation is subjected to a waste material of gypsum board, the separated paper pieces are water-washed using a rotary drum-type washing device. In a rotary drum-type washing device as a rotating cylindrical screen, while the lying air and water through-flow drum is rotated, paper pieces are thrown into the drum through the paper piece inlet of the drum and paper pieces are ejected through the paper piece exit. At this time, while the paper pieces travel from the paper piece inlet to the paper piece outlet, washing water is supplied to the paper pieces and the washing water including the paper pieces is agitated, and then washing water containing a gypsum component eliminated from the paper pieces is discharged toward the outside of the drum through a peripheral wall of the drum. As such a rotary drum-type washing device, a washing device can be used which is disclosed in Japanese Laid-Open Patent Application No. 08-176985, Japanese Laid-Open Patent Application No. 11-189981 or the like.

The number of revolutions of a rotary drum is appropriately determined and commonly 1-50 rpm, the size of screen mesh of the drum is 80 meshes (approximately 0.177 mm)-5 mm, and the ratio of the weight of washing water to the weight of provided paper pieces is in a range of 5-100, preferably 10-60. Additionally, the higher the number of revolutions of the rotary drum is, the effect of replacement of gypsum by water, that is, washing effect, tends to become higher. Also, washing water may be supplied from an internal cylinder and an external cylinder of the rotary drum, and when water containing a gypsum component (referred to as "white water" below), which has been used for washing the paper pieces at the former part, is recycled and fresh water is used at the latter part, the total amount of fresh water used in the entire of the washing process step can be reduced.

If the ratio of the weight of washing water to the weight of the provided paper pieces is less than 5, sufficient effect of replacement of gypsum having adhered to the paper pieces by water may not be obtained and it may difficult to reduce the amount of adhering gypsum in a final washed product (paper piece). On the other hand, if the weight ratio is greater than 100, the improvement of the washing effect may be low and the amount of used fresh water becomes higher so that the increase of the amount of used fresh water is economically inefficient.

In the present invention, when paper pieces before water washing are thrown into the rotary drum, the paper pieces dried by the heating in the former step may be directly thrown into it. However, in this case, when the dried paper pieces contacts washing water in the drum, desired washing effect may not be obtained since the paper pieces mutually agglomerate and form a lump such that the paper pieces are not sufficiently separated or dispersed in subsequent water washing. In order to avoid such a disadvantage, in a preferred embodiment of the present invention, paper pieces are previously wetted by a portion of washing water or dispersed or mixed into washing water before the paper pieces are thrown into the rotary drum. As a preferred embodiment, water has been poured into an agitation washing tank provided with agitating means, and paper pieces are thrown into the water in the agitation washing tank while agitating the water in the agitation washing tank. Then, the paper pieces which have been previously wetted by water or dispersed or mixed into water are thrown into the rotary drum. Thus, a plural paper pieces are sufficiently separated without mutual agglomeration of the paper pieces in the drum and washed by water due to the agitation. In the step of previously wetting the paper pieces by a portion of washing water or dispersing or mixing them into water, the ratio of the weight of the separated paper pieces to the weight of the portion of washing water is 1:1-1:15, preferably 1:3-1:10. If the weight ratio is 1:1 or less, the mutual agglomeration of the paper pieces in the rotary drum may not be sufficiently avoided. On the other hand, if the weight ratio is greater than 1:15, the dispersion effect of the paper pieces is not only too sufficient but also a device for preparatory dispersion or mixing becomes larger.

Additionally, in the present invention, warm water or hot water can be also used as a portion or all of the washing water. Further, if necessary, a weakly acidic aqueous solution such as a hydrochloric acid aqueous solution may be used. When these kinds of washing water are separately used, a gypsum component (dihydrate gypsum or hemihydrate gypsum (burnt gypsum)) having adhered to paper pieces can be efficiently dissolved, that is, replaced by water so as to wash the paper pieces.

[Dewatering Step]

After washing step, the paper pieces are subjected to a dewatering process. As a dewatering method used for a dewatering step in the method of recovering a base paper for gypsum board according to the present invention, a common dewatering means can be used such as a method of compressing or squeezing paper pieces by a roller and a method of using a centrifugal machine. In a preferred aspect of the present invention, a squeezing machine is used as dewatering means. As a squeezing machine, any of squeezing machines which can reduce water content contained in paper pieces by a method such as compression or squeezing of the paper pieces can be used and, for example, a screw press which is commonly used for the purpose of paper manufacturing, etc., can be provided. The number of screw revolutions of a screw press is appropriately selected but, preferably, is approximately 3-20 rpm. In the dewatering step, the concentration of a gypsum component dissolved and contained in water content can be reduced drastically (by approximately 0.2% by weight), and, as a result, the gypsum component contained in paper pieces can be also reduced.

The process of the embodiment described above can be implemented, for example, by an apparatus having a configuration shown in FIG. 2, wherein a waste material of gypsum board is continuously or sequentially processed through each of the steps of treatment for eliminating a contaminant contaminating into the waste material of gypsum board, breaking of the waste material of gypsum board, burning of the broken waste material of gypsum board, separation (selection) of paper pieces from the waste material, preparatory dispersion of the paper pieces in water, washing of the paper pieces, dewatering of the washed paper pieces and recovery of the dewatered paper pieces.

Due to the washing step described above, paper pieces of a base paper for gypsum board can be continuously and efficiently recovered from a waste material of gypsum board. That is, paper pieces to which a little or no gypsum component adheres can be continuously recovered from paper pieces to which gypsum has adhered. Also, paper pieces with a little water content can be obtained by squeeze-dewatering paper pieces washed with water. Further, after only a broken waste material of gypsum board or separated paper pieces is burnt under predetermined conditions so as to convert dihydrate gypsum adhering to the paper pieces to hemihydrate gypsum, the content of gypsum in the paper pieces of the base paper for gypsum board can be further reduced by conducting the water washing and dewatering steps. That is, paper pieces in which the content of gypsum is comparatively lower can be separated and recovered. As a result, the productivity with respect to the recovery process for paper pieces is dramatically improved compared to a batch processing according to a conventional technique.

According to the present invention, where paper pieces in which the amount of adhering gypsum is approximately 50% by weight is thrown into a rotary drum-type washing device, for example, approximately 100 kg-400 kg of paper pieces to which gypsum has adhered can be processed to a desired cleanness for 1 hour by using one washing device provided with a rotary drum with a diameter of 1.5 m and a length of 3.0 m, depending on the ability of a used rotary drum-type washing device. The throughput of paper pieces can be increased by increasing the diameter and/or length of the rotary drum.

Thus obtained paper pieces has capability of significantly contributing to the recycle of a waste material of gypsum board, the output of which is expected to increase in future, since they can be used for a raw material for a waste paper, a raw material for agriculture (for fertilizer) and other industrial applications.

Next, specific practical examples of the method of recovering a base paper for gypsum board according to the present invention are described.

Practical Example 1

A waste material of gypsum board in which a contaminant had been eliminated was thrown into a tetra-axial crusher and the waste material of gypsum board was broken such that the longitudinal diameter of a piece of the broken waste material of gypsum board was 20 mm or less. Then, a rotary screen with a screen mesh size of 10 mm was used to separate paper pieces of a base paper for gypsum board from the waste material of gypsum board on the screen. Then, the obtained paper pieces were heated at 150° C. for 2 hours using a rotary kiln so as to convert all the dihydrate gypsum having adhering to the paper pieces to burnt gypsum. Further, the heated paper pieces were subjected to a rotary centrifugal screen with a screen mesh size of 5 mm so as to separate the burnt gypsum from the paper pieces and select paper pieces for test on the screen. Then, the selected paper pieces were delivered to and collected in a silo by means of air transportation.

In a water washing step in practical example 1, a commercially available rotary drum-type washing device was used. While the rate of paper pieces provided to the rotary drum-type washing device was 100 kg/h and the rate of supplied fresh water was 500 kg (0.5 tons)/h, the water content and the content of a gypsum component in the washed paper pieces were measured at the conditions of a screen mesh size of 3 mm and the number of revolutions of 20 rpm.

Also, the content of a gypsum component (hemihydrate gypsum or burnt gypsum) in the paper pieces provided to the rotary drum-type washing device was 31.3%. Additionally, the content of a gypsum component was calculated as follows. Approximately 100 g of paper piece samples were subjected to constant weight drying at 40° C. and the weight of the dried paper pieces was measured. Then, the dried paper pieces were washed with water on a screen with 100 meshes (screen mesh size of approximately 0.149 mm) so that hemihydrate gypsum was slightly mashed and washed out, the paper pieces and paper powder remaining on the screen were subjected to constant weight drying at 40° C. again, and the total amount of the dried paper pieces and paper power was measured. Herein, the ratio of the weight difference of the paper components (paper and paper powder) between before and after the water washing to the weight of the original paper piece samples was defined as the content of gypsum component (%).

The content of a gypsum component contained in the paper piece samples after the water washing was calculated by a method described above, after the wetted paper piece samples were once subjected to constant weight dying at 40° C. and heated at 150° C. for 3 hours whereby contained dihydrate gypsum was converted to hemihydrate gypsum.

Also, the water content of the paper samples was calculated based on constant weight drying of the post-wash samples at 40° C.

Practical Example 2

A base paper for gypsum board was processed similarly to practical example 1 except that the amount of the provided fresh water in practical example 1 was changed to 1 ton/h, and the water content and the content of a gypsum component in paper pieces were measured.

Practical Examples 3-8

After the water washing in practical example 1 described above, the water content contained in the paper pieces was squeeze-dewatered using a screw press and the water content and the content of a gypsum component of obtained paper pieces were measured.

Additionally, in practical examples 7 and 8, paper pieces were previously disperse or mixed into ware in a water washing step. The rate of a portion of water, which portion was used for the preparatory dispersion of the paper pieces, in the range of 0.5-1.0 ton/h per 100 kg/h of the paper pieces.

Examples 9 and 10

In practical example 9, a base paper for gypsum board was processed similarly to practical example 3 except that the amount of the provided fresh water was reduced such that the dilution factor of the fresh water is less than 5 (is 4), and the water content and the content of a gypsum component in paper pieces were measured.

In practical example 10, a base paper for gypsum board was processed similarly to practical example 3 except that the amount of the provided fresh water was increased such that the dilution factor of the fresh water is greater than 100 (is 110), and the water content and the content of a gypsum component in paper pieces were measured.

Practical Examples 11 and 12

The paper pieces subjected to the screening after the breaking step which were used in practical example 1 were repeatedly subjected to a screen, without burning but, instead, with the application of shearing force to the paper pieces using a roller or the application of vibration to the paper pieces, and paper pieces were prepared such that the amount of gypsum having adhered to the paper pieces as dihydrate gypsum was approximately 37.1% (corresponding to approximately 31.3% for a hemihydrate gypsum standard).

The paper pieces to which no burning step was applied in the water washing step of practical example 8 were used to conduct a water washing process for the paper pieces such that the amount of supplied fresh water was 10 tons/h (for practical example 11) or 15 tons/h (for practical example 12) per 100 kg/h of the provided paper pieces, and the water content and the content of a gypsum component in paper pieces were measured.

Comparison Examples 1-2

100 kg of paper pieces broken and burnt similarly to the practical examples were thrown into a water tank supplied with 1 ton (for comparison example 1) or 5 tons (for comparison example 2) of fresh water while no rotary drum-type washing device is used. Then, the paper pieces were washed with standing for some time until paper was separated from a gypsum component and floated on or partially suspended in water and the gypsum component was precipitated and collected on the bottom. The washed paper pieces were recovered and squeeze-dewatered by a screw press similarly to the examples. The water content and the content of a gypsum component in the obtained paper pieces were measured.

The conditions for processing the base papers for gypsum board and the measurement values in practical examples 1-12 and comparison examples 1 and 2 are shown in the following Table.

TABLE

| | (a) | (b) | (c) | (d) | (e) | (f) | (g) | (h) | (i) |
|---|---|---|---|---|---|---|---|---|---|
| Blank | — | P | — | — | — | — | — | — | 31.3 |
| Ex. 1 | P | P | 100 | 0.5 | 5 | A | A | 500 | 5.23 |
| Ex. 2 | P | P | 100 | 1 | 10 | A | A | 480 | 2.54 |
| Ex. 3 | P | P | 100 | 3 | 30 | A | P | 46.2 | 1.03 |
| Ex. 4 | P | P | 100 | 5 | 50 | A | P | 48.3 | 0.46 |
| Ex. 5 | P | P | 200 | 14 | 70 | A | P | 45.6 | 0.12 |
| Ex. 6 | P | P | 100 | 10 | 100 | A | P | 42.8 | 0.20 |
| Ex. 7 | P | P | 100 | 3 | 30 | P | P | 49.1 | 0.08 |
| Ex. 8 | P | P | 200 | 10 | 50 | P | P | 48.6 | 0.21 |
| Ex. 9 | P | P | 100 | 0.4 | 4 | A | P | 45.5 | 5.82 |
| Ex. 10 | P | P | 100 | 11 | 110 | A | P | 49.1 | 0.23 |
| Ex. 11 | P | A | 100 | 10 | 100 | P | P | 53.2 | 7.80 |
| Ex. 12 | P | A | 100 | 15 | 150 | P | P | 54.1 | 6.90 |
| Comp. 1 | A | P | 100 | 1 | 10 | — | P | 48.8 | 8.40 |
| Comp. 2 | A | P | 100 | 5 | 50 | — | P | 46.6 | 7.20 |

Ex. = Practical example
Comp. = Comparison example
P = Presence
A = Absence
(a) Presence or Absence of employment of rotary drum type
(b) Presence or Absence of burning
(c) Amount of thrown paper pieces, kg/hour
(d) Amount of thrown fresh water, ton/hour
(e) Dilution factor
(f) Presence or Absence of preparatory water dispersion
(g) Presence or Absence of screw press
(h) Water content, %
(i) Content of adhering gypsum, %

The invention claimed is:

1. A method to recover a base paper for gypsum board from a waste material of gypsum board comprising a gypsum core and the base paper for gypsum board adhering thereto, comprising the steps of:
   breaking the waste material of gypsum board,
   separating a gypsum component and a paper piece of the base paper for gypsum board from the broken waste material of gypsum board thereby forming a separated paper piece, and
   washing the separated paper piece with water in a rotary drum-type washing device so as to eliminate a gypsum component adhering to the separated paper piece from the separated paper piece, and further comprising a step of
   previously adding the separated paper piece into a portion of washing water before the separated paper piece is introduced to the rotary drum-type washing device, and
   after water washing, dewatering the separated paper piece wherein the step of dewatering the paper piece comprises squeezing and dewatering of the separated paper piece by one of a roller, a centrifugal machine, and a squeezing machine,
   wherein the rotary drum-type washing device comprises a separated paper piece inlet at one end of rotatably lying air and water through-flow drum and a separated paper piece outlet at the other end thereof and is capable of supplying washing water to a separated paper piece in the air and water through-flow drum.

2. The method of recovering a base paper for gypsum board as claimed in claim 1, wherein a size of screen mesh of the air and water through-flow drum is about 0.177 mm to about 5 mm.

3. The method of recovering a base paper for gypsum board as claimed in claim 1, wherein the waste material of gypsum board is broken into a broken piece of the waste material of gypsum board and the broken piece of the waste material of gypsum board has a longitudinal diameter of about 100 mm or less.

4. The method of recovering a base paper for gypsum board as claimed in claim 1, wherein the gypsum component and the paper piece of the base paper for gypsum board are separated from the broken waste material of gypsum board by a screen mesh with a size of about 2 mm to about 20 mm.

* * * * *